United States Patent [19]
Weller

[11] 3,812,457
[45] May 21, 1974

[54] SEISMIC EXPLORATION METHOD
[75] Inventor: Charles E. Weller, Houston, Tex.
[73] Assignee: Shell Oil Company, New York, N.Y.
[22] Filed: Nov. 17, 1969
[21] Appl. No.: 877,350

[52] U.S. Cl............ 340/15.5 TD, 340/15.5 RC, 343/100.7
[51] Int. Cl............................................. G01v 1/36
[58] Field of Search ............. 340/15.5 R, 15.5 CD; 343/100.7

[56] References Cited
UNITED STATES PATENTS
| | | | |
|---|---|---|---|
| 3,070,749 | 12/1962 | Burns et al. | 340/15.5 |
| 3,171,126 | 2/1965 | Wiley | 343/100.7 |
| 3,281,773 | 10/1966 | Newman | 340/15.5 |
| 3,340,499 | 9/1967 | Hadley | 340/15.5 |
| 3,450,869 | 6/1969 | Wiley et al. | 343/100.7 |

FOREIGN PATENTS OR APPLICATIONS
177,640  1/1963  U.S.S.R................ 340/15

Primary Examiner—Richard A. Farley
Assistant Examiner—N. Moskowitz
Attorney, Agent, or Firm—Theodore E. Bieber

[57] ABSTRACT

Seismic exploration is conducted without using a seismic sound source by recording a plurality of relatively long stretches of ambient earth noise data at each of an array of seismic receiving stations, preprocessing the data from each station and producing correlation functions in which the data from each station is presented as a seismic data trace analogous to a conventional seismogram.

6 Claims, 4 Drawing Figures

PATENTED MAY 21 1974   3,812,457

INVENTOR:
CHARLES E. WELLER

SEISMIC EXPLORATION METHOD

BACKGROUND OF THE INVENTION

The present invention relates to seismic exploration and more particularly to seismic exploration without the use of a seismic source such as dynamite or vibrators.

Throughout the history of seismic exploration, seismic energy has been generated by means of seismic sound sources on or near the surface of the earth to provide seismic waves that are reflected from subsurface structures to seismic receiving stations on or near the surface of the earth. This approach to seismic exploration has been extremely valuable in the past and is expected to be of considerable value in the future. However, there are situations in which it is desirable to avoid the need for seismic energy sources. Avoiding the need for providing, and maintaining of devices for generating seismic energy makes it possible for seismic exploration to be conducted in areas such as heavily forested regions and other areas that are inaccessible to heavy equipment such as truck mounted drills, vibrators, etc.

It is therefore an object of this invention to provide a method of seismic exploration that does not require a seismic source.

SUMMARY OF THE INVENTION

In accordance with this invention a plurality of seismic receiving stations are disposed on or near the surface of the earth in an array that is adapted to selectively enhance the relative magnitude of seismic energy that is traveling generally vertically. The receiving stations are operated to provide earth noise data traces indicative of the amplitude with time of the appearances of acoustic energy at the respective receiving station during a time period that is at least long enough for vertically travelling energy to move from the vicinity of the array to a subterranean reflecting structure and back. The earth noise data trace from each receiving station is preprocessed at least to the extent of isolating a portion adapted to be correlated with the data trace. Such correlations are effected and the information provided by the resulting correlograms are displayed for visual analysis and interpretation as seismic data traces.

Although it was previously recognized that detectable acoustic energy is substantially continually appearing at or near the surface of the earth and is inclusive of both surface generated noise, such as that due to wind, human or animal habitation, or the like, and subsurface generated noise, from earthquakes and the like, previous seismic exploration procedures have all required an artificial source of seismic energy. The present invention is at least in part based on the discovery that the noise generated beneath the earth's surface contains utilizable vertically traveling components. These components are present in proportions and magnitudes such that, by selectively detecting and processing the energy that appears at a directional array of near-surface locations, the vertically traveling components can be utilized as acoustic energy that illuminates and defines the shape and position of a subterranean reflecting structure.

DESCRIPTION OF THE PREFERRED EMBODIMENT

Figure 1:
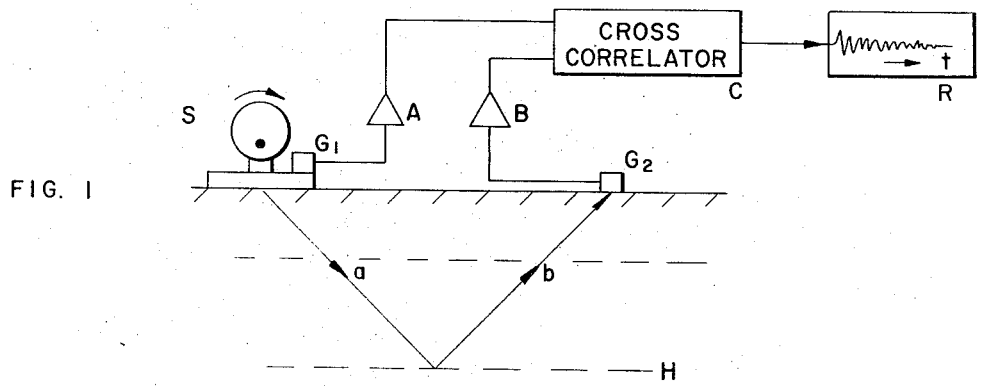
FIG. 1 is a schematic representation of a conventional seismic exploration system.

The present invention is a method of obtaining meaningful seismic information about subterranean geological formations from the ambient seismic noise always present in the earth.

Aside from earthquakes of destructive magnitudes, the earth is continuously subjected to a multitude of minute earthquakes which can be detected only with highly sensitive instruments. The frequency of occurrence of such microearthquakes or microseismims increases with decreasing magnitude. There are many naturally occurring earth tremors originating deep within the earth which are so small in magnitude that they cannot be detected in the usual manner by visually examining a recording of the ambient noise. Such micro-microearthquakes are usually masked by the ever present noise generated on or near the surface noise traveling in a horizontal direction just below the earth's surface, or. Two important aspects of the present invention are: (1) it utilizes a discrimination against the surface waves through the use of a properly designed geophone array, and (2) it utilizes statistical methods, such as those which are well known tools of communication theory, for extracting useful structural information from the many naturally occurring minute earthquakes that are masked by other types of noises, such as horizontally traveling surface waves arising from activities in nearby cities, passing traffic, or wave action near the seashore.

The first step in carrying out a method of seismic exploration without the aid of an artificial seismic source consists of laying out a surface array of receiving stations each consisting of one or a plurality of seismometers of other acoustic transducers. Ideally each receiving station output within the array should be recorded individually for subsequent directional scanning or, if this is not practical, then the array should be designed for pronounced directionality along the vertical. This is important in order to suppress naturally occurring, horizontally traveling waves or surface waves that may arise from numerous unwanted sources, including agricultural equipment or nearby habitation. Where the amount of surface noise is high, the signals from the seismometers within the array are preferably summed before recording. Numerous groups of receiving stations can be utilized simultaneously either in a linear configuration constituting a seismic line, or an areal array such as a rectangle, cross, circle or the like.

Next the output of the geophone array is recorded in some convenient manner. The required recording time will vary from minutes to a few hours depending upon the microseismic activity and the maximum depth from which reflection information is desired. For example, as the microseismic activity becomes small and/or the depth of the deepest reflector of interest increases the recording time should be increased. Satisfactory recordings have been obtained in the Gulf Coast area with 8 hour recording times.

The earth noise data obtained at each receiving station is preferably condensed by, in effect, increasing the frequency of its amplitude fluxations. For example, if the data is recorded on a medium such as magnetic tape, the initial recording may be conducted at relatively slow speeds and the condensation may be effected by reproducing the data while the record is advanced at a relatively faster speed. In such a procedure typical speedups can advantageously increase the rate by four to 16 or more times.

The data obtained at each receiving station is preferably subjected to an automatic spectrum whitening. In such a procedure the data being processed is passed through a series of parallel narrow bandpass filters. The filter outputs are each subjected to an automatic gain control and the gain controlled outputs are recombined in the form of a weighted sum. Methods and equipment that are suitable for effecting such an automatic spectrum whitening have been described, in connection with conventional seismic data traces, in U.S. Pat. Nos. such as 3,327,805 and 3,454,924. Such an automatic spectrum whitening provides advantages inclusive of (1) the suppression of any periodic component in the recorded noise, such as the noise from a pump or a motor near the recording site, that might otherwise predominate in the final correlogram and (2) the augmenting of the high frequency portion of the noise energy, which is the portion that tends to be the most heavily attenuated during the propogation through the earth.

After preprocessing, a long term one-sided autocorrelation function is computed for the data received at each seismic receiving station. The autocorrelation function of a recorded "noise" trace $si(t$ is defined as follows:

$$\phi_{ii}(\tau) = \int_0^T S_i(t) S_i(t+\tau) dt$$

$\phi_{ii}(\tau)$ is the autocorrelation function for the $i^{th}$ channel computed over the desired delay range $\tau$, where $\tau$ is typically from 0 to +5 sec., and corresponds to twice the seismic travel time to the deepest reflecting horizons of interest, although meaningful results have been obtained to 12.5 sec. delay.

$Si(t)$ is the $i^{th}$ channel time signal $T$ is the length of the record

The autocorrelation function is a continuous function of time and a graph thereof very closely resembles that of a normal seismogram in appearance. The autocorrelation functions may be displayed by the techniques used for normal seismograms.

The ordinary reflection seismogram is a record obtained by exciting a layered acoustic medium by an impulsive source, such as the explosion of a charge of dynamite, at or just below the surface. Mathematically such a reflection seismogram is equivalent to the one-sided autocorrelation function of the signal, as recorded on the surface, when the same layered medium is excited by an impulsive source at depth. This means that if we were to place a charge of dynamite at say 20,000 ft depth and record on the surface the vibrations resulting from the explosion at depth, then half of the symmetric autocorrelation function of the recorded signal should yield the same structural information about the upper 20,000 ft layer of the earth as the reflection seismogram obtained with a charge placed near the surface. The theory cited above can be easily extended to a random sequence of impulselike excitations in time or depth, or both. Whether we explode a sequence of charges randomly distributed in time or depth, the correlograms resulting from each explosion will simply reinforce each other.

In the present invention, rather than planting and exploding many charges at depth, I utilize foci of naturally occurring seismic distrubances which are distributed throughout the earth's volume. While the density of such foci will vary from one geographic location to another, I have found that even in a region of notoriously low seismic activity such as the Gulf Coast region noise recordings of one to 2 hours duration are sufficient to yield meaningful results. It is expected that in regions of high seismic activity the recording time will substantially be reduced.

The foregoing autocorrelation and crosscorrelation manipulations can be conveniently carried out on a Princeton Applied Research Corporation, Model 100 correlation function computer. By way of example, the following details are given as to procedures that have been found successful. First, six geophone stations having a 17 element square geophone array per station were placed at 200 foot intervals over the region to be explored. Within each array 16 seismometers were placed 15 feet apart along the periphery of a square, with one additional seismometer placed at the center of the square. The array was designed for vertical directionality, its gain being down 6 db at apparent horizontal wave numbers $k_x = k_y = 0.011$ Hz/ft. Noise was then recorded for 8 hours. Each of the 6 eight-hour noise traces was spectrally whitened, bandpass filtered from 1 to 35/Hz; bandlimiting in the course of preprocessing also served as an aliasing filter. The data were then speeded up by 64 times and fed into a Princeton Applied Research signal correlator. Meaningful alignment of events among the six correlograms obtained from the six recorded signal channels corresponding to known geologic boundaries were obtained to beyond 5 seconds delay time.

In summary, the present invention is based upon the existence of coherent seismic waves trapped between the earth's surface and the underlying geologic structures. However, because there is no artificial source of seismic energy, the ground waves detected at a geophone array have a very high component of incoherent noise as well as horizontally traveling seismic waves and this is preferably eliminated to enhance the useful information that can be obtained from a seismic record made without the benefit of an artificial seismic source. The problem then of obtaining seismic data traces without using an artificial source of seismic energy is solved by the present invention, by, in effect, isolating that component of the naturally existing seismic waves that is coherent and reflected back and forth between the earth's surface and underlying geologic formations from all other components.

Note that the fundamental idea of this invention can best be explained by means of figures such as the following: FIG. 1 shows the basic concept of a known seismic exploration method using a controlled seismic energy source, such as a vibrating source. FIG. 1 shows a conventional process (for illustration only) in which an eccentric rotary mass S is mounted on a platform. In a common operating procedure, the source is driven so that the vertical displacement function is a frequency modulated sinusoidal wave of some 7 seconds duration. The down-going wave is partially reflected from the geologic horizon H and the reflected energy is received by geophone G2. Geophone G1 is placed on or near the platform containing source S to record the signal produced by the source. The signals from G2 and G2 are amplified by amplifiers A and B and are applied to a cross correlator C. The output of such a cross-correlator is analogous to a conventional reflection seismic data trace. As known from communication theory, the same seismic record could be obtained by driving the earth surface with a random noise signal, as long as the frequency spectrum of the resulting displacement function is equivalent to the above type of frequency-modulated sinusoidal wave.

Figure 2:
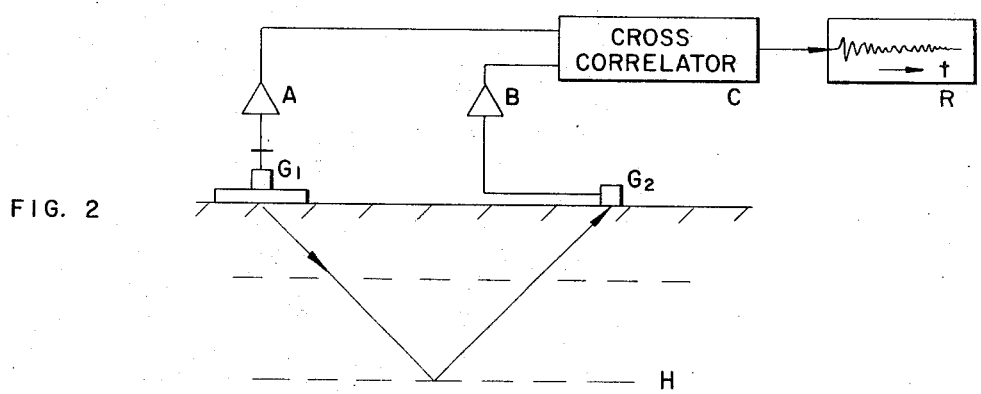
FIG. 2 is a schematic representation of the seismic exploration system of the present invention.

FIG. 2 shows the principle of one way of operating the present invention. As a result of the microseismic earthquake activity within the earth the near surface portions are in continuous motion and this motion is detected by geophone G1. A portion of the surface near G1 thus becomes, in effect, an uncontrolled seismic source and some of the minute power emitted by this source is returned to be received at geophone G2. The amplified signals from G1 and G2 are then fed to correlator C as described above.

Figure 3:
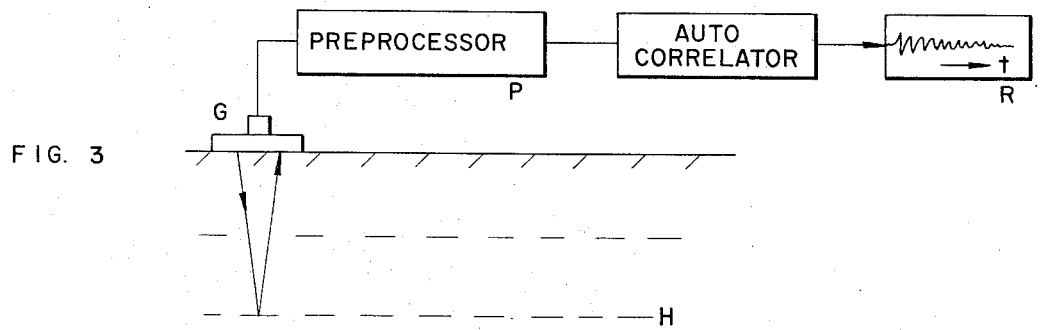
FIG. 3 is a modified schematic representation of the seismic exploration system of the present invention.

FIG. 3 shows the principle of a preferred way of practicing the present invention. This procedure utilizes a single geophone G to serve the dual purpose of measuring the earth motion due to both outgoing and reflected microseismic energy. A condensed and automatic ally spectrumwhitened signal from G is autocorrelated, by utilizing an isolated portion of the signal itself, and is displayed in the form of a reflection seismic data trace.

As discussed above, it is advantageous to use an array of geophones so that the outputs of a plurality of the geophones may be summed in the field, or recorded separately and summed later, in order to provide data traces that are selectively responsive to wave energy that emerges from within the earth along selected directions.

Figure 4:
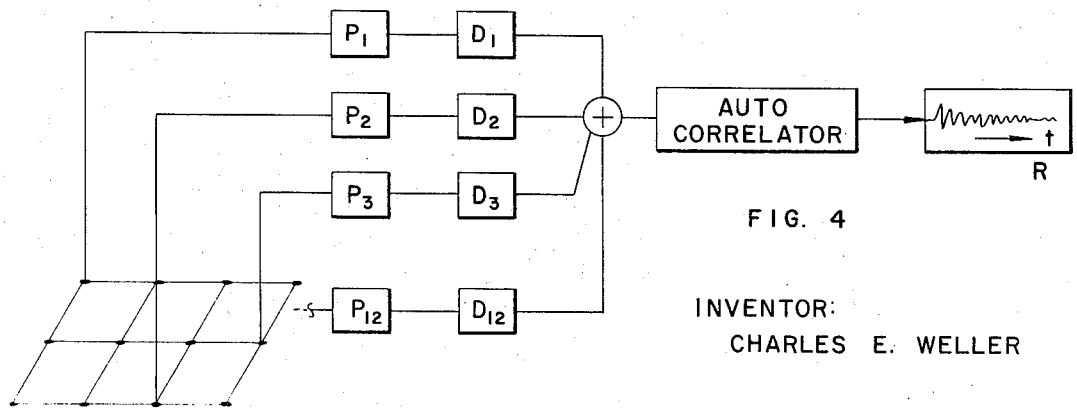
FIG. 4 is an expanded representation of the seismic exploration system of the present invention.

FIG. 4 shows the use of an array of 12 geophones. Each geophone output is passed through a preprocessor T1 to T12 (e.g., for automatic spectrum whitening) and a delay means D1 to D12. The purpose of the delay means is to phase the wave fronts which arrive from below in a manner that enhances the energy coming from selected generally downward directions. After the traces have been summed the correlogram is computed and displayed as a reflection seismogram from a receiving station located at substantially the center of the array of geophones.

I claim as my invention:

1. A method of seismic exploration, comprising:

disposing a plurality of seismic receiving stations at horizontally spaced locations near the surface of the earth, operating said receiving stations to produce earth noise data signals indicative of the amplitudes with time at which acoustic energy appears at a plurality of said station locations during a time period many times greater than the travel time of acoustic energy from the vicinity of said stations to a subterranean reflecting structure and back, subjecting the noise data signals to preprocessing including summing selected groups of said noise data signals to provide signals that are selectively responsive to the energy that emerges along selected directions from locations within the earth, isolated portions of the data signals being adapted to be correlated with each other, the isolated portions representing acoustic energy received at the surface and reflected back down to the subterranean structure then reflected back up to the receiving stations; and correlating said isolated portions of the data signals to provide a plurality of correlograms that are adapted to be visually displayed for seismic data analysis and interpretation.

2. The process of claim 1 in which said preprocessing includes an automatic spectrum whitening of said data signals.

3. The process of claim 1 in which said preprocessing includes a condensation of said data signals by, in effect, increasing the frequency of the amplitude fluctations of the data.

4. A method of seismic exploration, comprising the steps of:

placing a large number of seismometers in an array at the earth's surface;

summing signals from said seismometers to produce a seismic signal in which horizontal waves are rejected and waves generally vertically traveling are enhanced, the seismic signal being produced continuously over a very long period;

correlating data in the seismic signal to obtain correlation signals which represent earth noise impulses which are received at the seismometers then are reflected back down to subsurface formations then reflected back up to the array whereby similar impulses are received which are spaced in time by a period corresponding to the travel time of the noise impulse from the surface to the formation and back to the surface; and recording the correlation signals to provide a seismogram.

5. The method of claim 1 wherein said correlograms are one-sided auto-correlation functions.

6. The method of claim 1 wherein said correlating is a cross-correlation of one seismic receiving station with at least one other seismic receiving station.

* * * * *